(12) United States Patent
Cha et al.

(10) Patent No.: US 8,218,096 B2
(45) Date of Patent: Jul. 10, 2012

(54) METHOD OF CONTROLLING A 2D/3D SWITCHABLE DISPLAY APPARATUS INCLUDING A SCANNING BACKLIGHT AND A PLURALITY OF LIGHT GUIDE PLATES

(75) Inventors: Kyung-hoon Cha, Yongin-si (KR); Sergey Chestak, Suwon-si (KR); Dae-sik Kim, Suwon-si (KR); Jae-phil Koo, Seoul (KR); Seon-deok Hwang, Jochiwon-eup (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 11/968,924

(22) Filed: Jan. 3, 2008

(65) Prior Publication Data

US 2008/0297671 A1 Dec. 4, 2008

(30) Foreign Application Priority Data

May 30, 2007 (KR) .................... 10-2007-0052919

(51) Int. Cl.
*G02F 1/1335* (2006.01)
*G09G 3/36* (2006.01)
*G02B 27/26* (2006.01)
*H04N 13/04* (2006.01)

(52) U.S. Cl. ............ 349/15; 349/65; 345/102; 359/465; 348/55; 348/58; 348/59

(58) Field of Classification Search ............... 349/15; 345/6; 359/465, 475; 348/55, 58, 59
See application file for complete search history.

(56) References Cited

U.S. PATENT DOCUMENTS 5,991,074 A * 11/1999 Nose et al. ................. 359/465
2005/0007516 A1 * 1/2005 Hong et al. ................. 349/64
2005/0134762 A1 * 6/2005 Sung et al. ................. 349/96

(Continued)

FOREIGN PATENT DOCUMENTS

CN 1632667 A 6/2005

(Continued)

OTHER PUBLICATIONS

Office Action issued Mar. 23, 2011, in Chinese Application No. 200810082317.9.

(Continued)

*Primary Examiner* — Mark Robinson
*Assistant Examiner* — Dennis Y Kim
(74) *Attorney, Agent, or Firm* — Sughrue Mion, PLLC

(57) ABSTRACT

Provided are a 2D (2-dimensional)/3D (3-dimensional) display apparatus using a scanning backlight and a method of controlling the same. The apparatus sequentially includes a backlight which is capable of scanning and irradiating polarized light, a retarder which transmits light emitted from the backlight as phase-maintained light and phase-delayed light, a lenticular array which transmits light from the retarder as directional light, and a display panel which displays an inputted image and which is illuminated by light being transmitted through the lenticular array. The backlight includes a plurality of light guide plates which are independently disposed and arranged in parallel with one another, a plurality of light sources which are provided for the respective light guide plates and emit light, and a plurality of polarization filters which are arranged in front of the respective light guide plates. The scanning frequency of the backlight is synchronized with the input frequency of the input frames so that an illumination function and a scanning function are simultaneously performed using one backlight, a 2D image and a 3D image are efficiently displayed and crosstalk is reduced.

4 Claims, 9 Drawing Sheets

U.S. PATENT DOCUMENTS

| | | |
|---|---|---|
| 2006/0192746 A1 | 8/2006 | Ioki et al. |
| 2007/0008406 A1 | 1/2007 | Shestak et al. |
| 2007/0165145 A1* | 7/2007 | Sugiyama .................. 349/15 |
| 2008/0084513 A1* | 4/2008 | Brott et al. ................. 349/15 |

FOREIGN PATENT DOCUMENTS

| | | |
|---|---|---|
| CN | 1916692 A | 2/2007 |

OTHER PUBLICATIONS

Communication dated Mar. 21, 2012 from the State Intellectual Property Office of P.R. China in counterpart Chinese application No. 200810082317.9.

* cited by examiner

METHOD OF CONTROLLING A 2D/3D SWITCHABLE DISPLAY APPARATUS INCLUDING A SCANNING BACKLIGHT AND A PLURALITY OF LIGHT GUIDE PLATES

CROSS-REFERENCE TO RELATED PATENT APPLICATIONS

This application claims priority from Korean Patent Application No. 10-2007-0052919, filed on May 30, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to a two-dimensional (2D)/three-dimensional (3D) display apparatus with full resolution using a scanning backlight, and more particularly, to a display apparatus with a scanning panel and a lighting unit using a backlight, in which a 2D/3D display mode can be selected by only using an on/off state of the backlight and a 3D display can be achieved by using fewer components compared to the prior art.

2. Description of the Related Art

Owing to the development of high-resolution TVs, TVs displaying realistic images have gradually become more desired and products capable of viewing a TV in a stereoscopic manner have also become desired. Besides, a stereoscopic effect is expected to benefit many fields such as medical imaging, games, advertising, education, and military affairs.

FIG. 1 illustrates the structure of a conventional liquid crystal display (LCD) system.

The conventional LCD system 100 capable of 2D/3D display comprises an LCD panel 102, a lenticular array 104, a micro-retarder 106, a P-polarization/S-Polarization (P/S) panel 108, and a backlight 110, as illustrated in FIG. 1. The conventional LCD system 100 displays a 3D image from two view points by realizing full resolution using polarization of light at predetermined time intervals.

In the conventional art, the LCD panel 102 comprises a display panel which comprises display components for displaying an image, a polarization switch which switches an output phase of an anisotropic element according to an image updating speed of the display panel, and a secondary polarizer which only outputs a signal of predetermined phase from among phases of output signals of the polarization switch. The lenticular array 104 outputs a signal outputted from the display panel as a directional signal for both eyes of a viewer, and the micro-retarder 106 is aligned in parallel with the lenticular array 104 and alternately outputs an output of the backlight 110 as a phase-maintained signal and a phase-delayed signal.

The P/S panel 108 allows p-polarized light and s-polarized light of an inputted image to be cyclically and alternately transmitted and scans them in one direction. This is because 3D display using a binocular time difference can be achieved, that is, left and right images can be alternately displayed.

The backlight 110 performs a function of illuminating an image of the LCD panel 102 by using one light guide plate.

Unlike a plasma display panel (PDP) or a field emission display (FED), display using an LCD is non-lighting (light-receiving element) and thus, an LCD cannot be used in a place where there is no light. A backlight for solving this problem illuminates a display surface uniformly so that the LCD may be used in a dark place.

The backlight 110 and the P/S panel 108 of the conventional LCD change a polarization direction according to the frequency of an image signal of left and right images displayed on the LCD panel 102.

Thus, a conventional 3D display apparatus needs two elements such as a backlight and a P-polarization/S-polarization (P/S) panel, so as to emit light to illuminate a display panel while scanning, and to provide polarization. Thus, due to an increase in the number of components to which light should be transmitted, it is difficult to commercialize the conventional 3D display apparatus, and brightness is lowered. Thus, more power is needed and costs increase when trying to solve this lighting problem.

In a conventional auto-stereoscopic display, stereoscopic images with full resolution, which can be viewed without glasses and without a serious increase in crosstalk, can be provided. However, in the conventional LCD system, left and right images are temporally divided so that a 3D image with full resolution can be viewed. However, due to a number of components, it is difficult to commercialize the conventional LCD system. In particular, compared to other technologies, degradation of performance related to brightness is remarkable. In order to solve this problem, more power is needed and costs increase.

SUMMARY OF THE INVENTION

The present invention provides a display apparatus in which, when an apparatus capable of two-dimensional (2D)/three-dimensional (3D) display, the number of components is reduced, costs are reduced and lowering of brightness is prevented, and a method of controlling the same.

The present invention also provides a 2D/3D display apparatus using a scanning backlight which does not require additional components and in which the number of components is reduced, adverse effects of crosstalk are reduced and an image with full resolution is displayed, and a method of controlling the same.

According to an aspect of the present invention, there is provided a 2D(2-dimensional)/3D(3-dimensional) display apparatus using a scanning backlight, the apparatus sequentially comprising: a backlight which is capable of scanning and irradiating polarized light; a retarder which transmits light emitted from the backlight as phase-maintained light and phase-delayed light; a lenticular array which transmits light from the retarder as directional light; and a display panel which displays an inputted image and which is illuminated by light being transmitted through the lenticular array.

The backlight may comprise: a plurality of light guide plates which are independently disposed and arranged in parallel with one another; a plurality of light sources which are provided for the respective light guide plates and emit light; and a plurality of polarization filters which are arranged in front of the respective light guide plates.

The polarization filter may comprise a first filter having a predetermined polarization direction and a second filter having a polarization direction that is different to that of the first filter by 90° and the first filter and the second filter are alternately arranged in front of each of the light guide plates.

Films which reflect light may be provided so that light cannot be transmitted between the light guide plates.

Each light guide plate may be treated with a coating so that light cannot be transmitted between the light guide plates.

The apparatus may further comprise a diffuser plate which is disposed between the backlight and the retarder.

The backlight may further comprises a controller which turns on or turns off according to a frequency of an input signal.

The controller may control the backlight so that odd-numbered light sources of the backlight are turned on only at a frequency at which odd-numbered frames are inputted to the display panel, even-numbered light sources of the backlight are turned on only at a frequency at which even-numbered frames are inputted to the display panel, and while input of the odd-numbered or even-numbered frames to the display panel is repeatedly performed, the odd-numbered and even-numbered light sources are alternately turned on.

The controller may control the backlight so that, for 3D display, as the frames are inputted to an upper end of the display panel and move to a lower end, the light sources illuminating the frames are sequentially turned on from the upper end to the lower end and as the frames move to a lower end of the display panel, and the display of the frames is completed, the light sources that are turned on so as to illuminate the display panel are turned off.

The controller may control the backlight so that, for 3D display, as the frames are inputted to an upper end of the display panel and move to a lower direction, the light sources illuminating the frames are sequentially turned on in a lower direction from an upper direction and the next light source is turned on and the currently-turned-on light sources are turned off simultaneously.

For 2D display, the odd-numbered frames and the even-numbered frames that are inputted immediately after the odd-numbered frames, respectively, are the same image.

A pitch of the lenticular lens may have a width corresponding to two pixels of the display panel.

A first array line in which there is no phase delay and a second array line in which there is a phase delay of ½ frequency may repeatedly occur in the retarder, and each of the array lines has a width corresponding to one pixel of the display panel.

A first array line in which there is a phase delay of ¼ frequency and a second array line in which there is a phase delay of ¾ frequency may repeatedly occur in the retarder, and each of the array lines has a width corresponding to one pixel of the display panel.

According to another aspect of the present invention, there is provided a method of controlling a 2D/3D display apparatus using a scanning backlight, the display apparatus comprising a backlight illuminating a display panel and including a plurality of light guide plates and a plurality of light sources disposed on the respective light guide plates, the method comprising: turning on odd-numbered light sources of the backlight only at a frequency at which odd-numbered frames are inputted to the display panel; turning on even-numbered light sources of the backlight only at a frequency at which even-numbered frames are inputted to the display panel; and while input of the odd-numbered or even-numbered frames is repeatedly performed, repeatedly and alternately turning on the odd-numbered or even-numbered light sources.

The turning on of the odd-numbered or even-numbered light sources may comprise: for 3D display, as the frames are inputted to an upper end of the display panel and move to a lower end, sequentially turning on the light sources illuminating the frames from the upper end to the lower end; as the frames move to a lower end of the display panel, and the display of the frames is completed, turning off the light sources that are turned on so as to illuminate the display panel; and as the frames are consecutively inputted to the display panel and move toward the lower end, repeatedly performing the turning on and the turning off.

The turning on of the odd-numbered or even-numbered light sources may comprise for 3D display, as the frames are inputted to an upper end of the display panel and move to a lower end, sequentially turning on the light sources illuminating the frames from high to low; turning on the next light source and simultaneously turning off the currently-turned-on light sources; and repeatedly performing the turning on.

For 2D display, the odd-numbered frames and the even-numbered frames that are inputted immediately after the odd-numbered frames, respectively, may be the same image.

According to another aspect of the present invention, there is provided a computer readable recording medium storing a program for executing the method of controlling a 2D/3D display apparatus using a scanning backlight.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
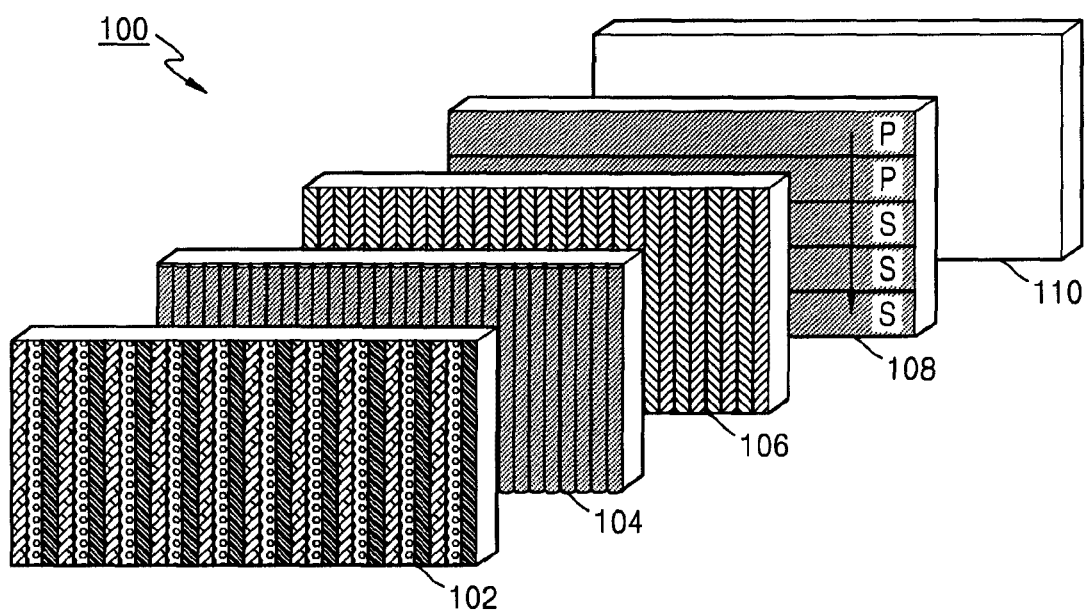
FIG. 1 illustrates the structure of a conventional liquid crystal display (LCD) system.
Figure 2:
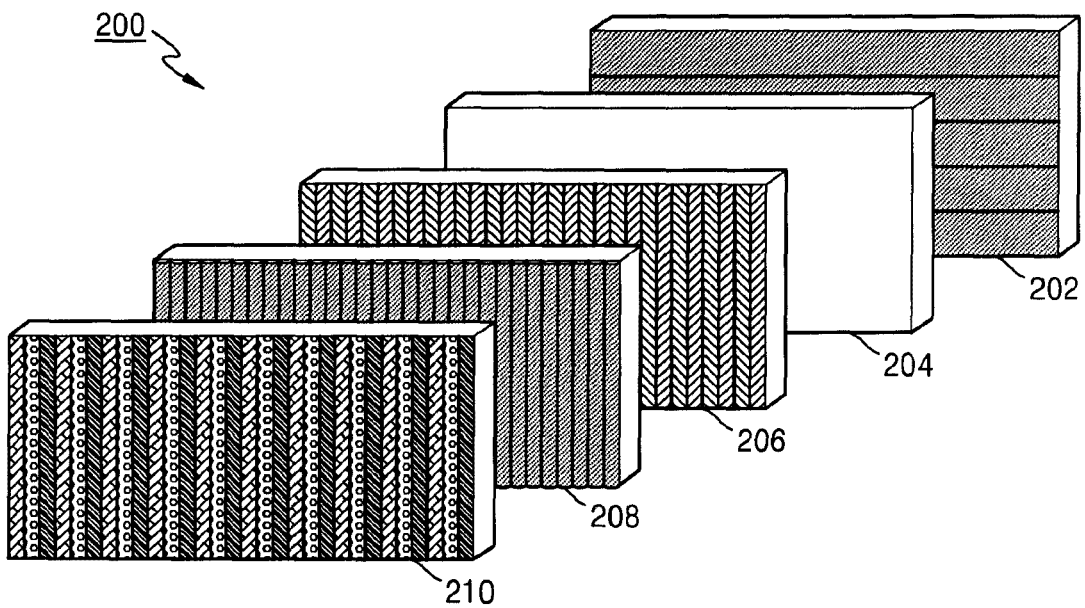
FIG. 2 illustrates a two-dimensional (2D)/three-dimensional (3D) display apparatus with full resolution using a scanning backlight according to an exemplary embodiment of the present invention.

FIG. 2 illustrates a two-dimensional (2D)/three-dimensional (3D) display apparatus 200 with full resolution using a scanning backlight according to an exemplary embodiment of the present invention. The 2D/3D display apparatus 200 comprises a backlight 202, a diffuser plate 204, a retarder 206, a lenticular array 208, and a display panel 210.

The backlight 202 provides light to illuminate the display panel 210, emits light having a polarization direction and performs a scanning function. In detail, the backlight 202 illuminates an image using an light-emitting diode (LED) or any one of a point light source, a linear light source, and a surface light source and performs a scanning function which is the function of a P-polarization/S-polarization (P/S) panel, so as to perform both of conventional backlight and P/S panel functions. In addition, in order to display a 3D image, the backlight 202 changes polarization directions of p-polarized light and s-polarized light according to signal frequencies of left and right images displayed on the display panel 210.

The retarder 206 is aligned in parallel with the backlight 202 and the lenticular array 208 and allows light, which is emitted from the backlight 202 and has a predetermined polarization direction, to be transmitted as a phase-maintained signal and phase-delayed signal and emits the light to the lenticular array 208. An array line of the retarder 206 has a width corresponding to one pixel of the display panel 210. In an exemplary embodiment of the present invention, a first array line in which there is no phase delay and a second array line in which there is a phase delay of ½ of the frequency repeatedly occur in the retarder 206. In addition, an exemplary embodiment in which a first array line, in which there is phase delay of ¼ of the frequency, and a second array line, in which there is phase delay of ¾ of the frequency, occur alternately, is possible.

The lenticular array 208 transmits light from the retarder 206 as directional light for both eyes of a viewer and emits the light to the display panel 210. A lenticular lens of the lenticular array 208 is arranged in parallel with an array line of a retarder, and in an exemplary embodiment of the present invention, a pitch of the lenticular lens has a width corresponding to two pixels of the display panel 210.

While the phase of the light emitted from the backlight 202 is maintained, the light is transmitted through the retarder 206 and the lenticular array 208 sequentially and reaches the display panel 210 so that the display panel 210 displays an image. An image displayed on the display panel 210 is illuminated by the light so that a viewer can view the image. In general, the display panel 210 uses a liquid crystal display (LCD), and an image inputted to the display panel 210 is displayed on the display panel 210 at a predetermined frequency, for example, at a frequency of 60 Hz.

In the display apparatus according to an exemplary embodiment of the present invention, the backlight 202 implements a conventional backlight and a conventional P/S panel as one unit. A conventional system can display a 3D image with full resolution but due to a number of components, it is difficult to commercialize the conventional system. In this regard, according to the present invention, two components can be reduced to one component so as to reduce costs and thus, the present invention is efficient and economical. In addition, since the conventional system transmits light through two components, loss of brightness and degradation of performance occur. However, according to an exemplary embodiment of the present invention, since an additional electrical device for the P/S panel is not required, brightness is not lowered and a conventional scanning method can be implemented so that crosstalk can be reduced.

Meanwhile, light generated by a light source of a backlight may not be uniform, which causes an image to be illuminated non-uniformly. Thus, in order to display a more uniform image, in an exemplary embodiment of the present invention, a diffuser plate 204 is installed at a backlight. Since light being transmitted through the diffuser plate must be kept in a predetermined polarization direction, the diffuser plate 204 must have a polarization direction maintained therein. As such, non-uniform light generated by the light source of the backlight is uniformly diffused so that an image having good uniformity can be provided.

The structure and operation of the backlight 202 for achieving the technical objective of the display apparatus according to the present invention will be described in detail with reference to FIGS. 3 through 7.

Figure 3:
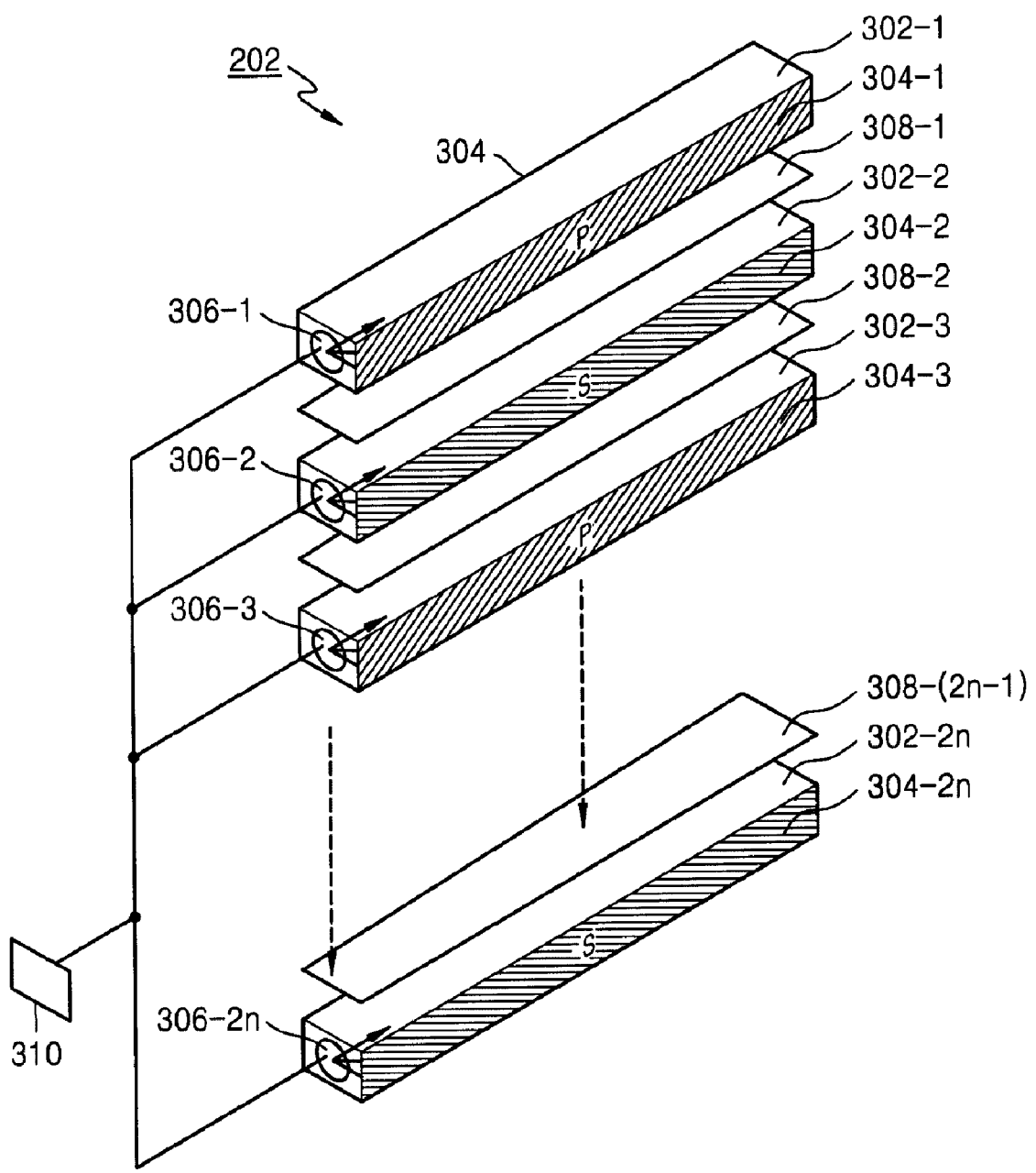
FIG. 3 illustrates the structure of a scanning backlight according to an exemplary embodiment of the present invention.

FIG. 3 illustrates the structure of a scanning backlight 202 according to an exemplary embodiment of the present invention. The backlight 202 of FIG. 3 comprises a plurality of light guide plates 302-1, 302-2, through to, 302-(2$n$–1), and 302-2$n$, a plurality of polarization filters 304-1, 304-2, through to, 304-(2$n$–1), and 304-2$n$, a plurality of light sources 306-1, 306-2, through to, 306-(2$n$–1), and 306-2$n$, and a controller 310. The backlight 202 further comprises a plurality of filters 308-1, 308-2, through to, 308-(2$n$–2), and 308-(2$n$–1) on which light is reflected. Here, n is a positive integer.

The light guide plates 302-1, 302-2, through to, 302-(2$n$–1), and 302-2$n$ allow the path of light to be directed forwards so that light from the light source can be uniformly emitted on the entire area of a display panel. According to an exemplary embodiment of the present invention, a light guide plate is not formed as one body but a plurality of light guide plates are independently provided and are arranged in parallel with one another, that is, a shape is formed in which a plurality of light guide plates are arranged in one direction.

The polarization filters 304-1, 304-2, through to, 304-(2$n$–1), and 304-2$n$ allow light from the light sources 306-1, 306-2, through to, 306-(2$n$–1), and 306-2$n$ to be maintained in a predetermined polarization direction when the light is transmitted to the front of the backlight through the light guide plates 302-1, 302-2, through to, 302-(2$n$–1), and 302-2$n$. In an exemplary embodiment of the present invention, the polarization filters 304-1, 304-2, through to, 304-(2$n$–1), and 304-2$n$ are provided to the light guide plates 302-1, 302-2, through to, 302-(2$n$–1), and 302-2$n$, respectively, and a first filter having a predetermined polarization direction and a second filter having a polarization direction that differs from that of the first filter by 90°, are alternately arranged in front of each of the light guide plates 302-1, 302-2, through to, 302-(2$n$–1), and 302-2$n$. In other words, when a polarization filter (p-polarization) in a direction of 0° is provided at one of the light guide plates 302-1, 302-3, through to, 302-(2$n$–3), and 302-(2$n$–1), a polarization filter (s-polarization) of light guide plates 302-2, 302-4, through to, 302-(2$n$–2), and 302-2$n$ disposed on and under the light guide plates 302-1, 302-3, through to, 302-(2$n$–3), and 302-(2$n$–1) has a direction of 90°. Similarly, polarization filters in directions of 45° and 135° (or –45°) are available.

The light sources 306-1, 306-2, through to, 306-(2$n$–1), and 306-2$n$ provide light to the backlight 202 so as to emit an image displayed on the display panel 210. The light sources 306-1, 306-2, through to, 306-(2$n$–1), and 306-2$n$ of the backlight according to the present invention may be one of a point light source, a linear light source, and a surface light source. The light sources 306-1, 306-2, through to, 306-(2$n$–1), and 306-2$n$ formed in one unit are provided to one of the light guide plates 302-1, 302-2, through to, 302-(2$n$–1), and 302-2$n$.

A backlight may be classified into a straight view type backlight and an edge type backlight according to the shapes of the light sources. The straight view type backlight emits light directly onto a display panel, and a light source of the edge type backlight is disposed near to a light guide plate so that light passes through the light guide plate and is directed forward. The backlight according to an exemplary embodiment of the present invention may be a straight view type or an edge type.

When one segment of the backlight comprises one independent light guide plate 302-1, 302-2, through to, 302-(2n–1), or 302-2n and light sources 306-1, 306-2, through to, 306-(2n–1), and 306-2n formed in one unit of each of the light guide plates, each light source can operate independently, and each segment can be turned on or off independent of other segments. As a result, scanning by the backlight 202 which is the feature of the present invention can be performed.

The backlight comprises 2n segments, i.e., 2n light guide plates, as illustrated in FIG. 3. Since there are 2n light guide plates, a light source also exists in 2n units. As the number of separated segments increases, one light guide plate illuminates a more detailed portion of an image. Thus, as the number of segments increases, performance is further improved. That is, as n increases, it is more advantageous to achieve the technical object of the present invention. Theoretically, it is most preferable that one light guide plate is allocated to a line corresponding to one pixel of an image.

Since light guide plates are closely combined with one another, light emitted from a light source of each light guide plate can be transmitted through an adjacent light guide plate. This may cause the brightness of the backlight to be lowered and crosstalk to occur. In an exemplary embodiment of the present invention, filters 308-1, 308-2, through to, and 308-(2n–1) which reflect light, may be disposed between light guide plates or each light guide plate may be treated with a coating so that light cannot be transmitted through the light guide plates.

The controller 310 controls turn-on and turn-off of the light sources 306-1, 306-2, through to, 306-(2n–1), and 306-2n of the backlight so as to implement an exemplary embodiment of the present invention.

Figure 4A:
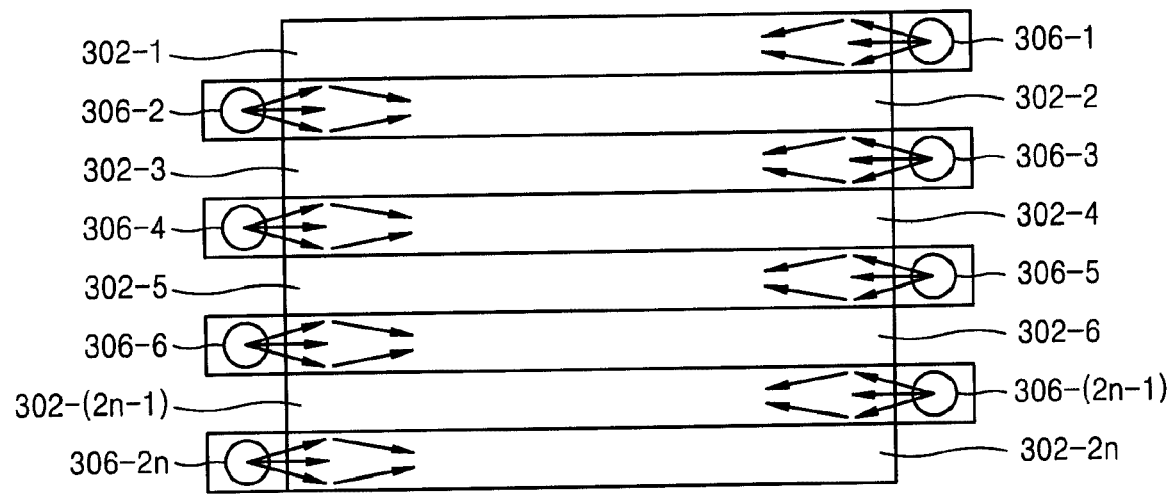
FIG. 4A illustrates a shape of a light source positioned at a light guide plate of a backlight according to an exemplary embodiment of the present invention.
Figure 4B:
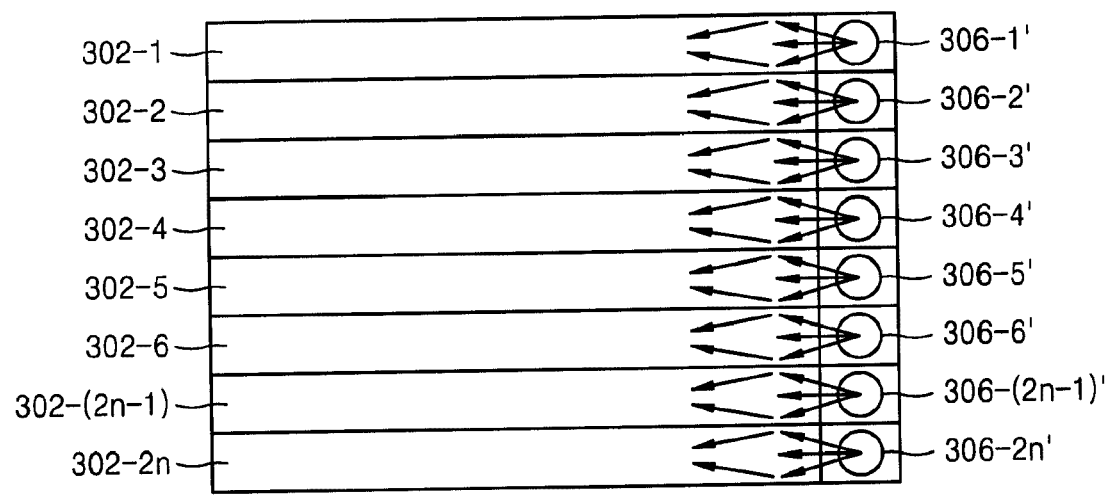
FIG. 4B illustrates another shape of a light source disposed at a light guide plate of a backlight according to an exemplary embodiment of the present invention.

FIGS. 4A and 4B illustrate several shapes of light sources disposed at light guide plates of the backlight according to an exemplary embodiment of the present invention.

Odd-numbered light sources 306-1, 306-3, 306-(2n–3), and 306-(2n–1) of light sources 306-1, 306-2, through to, 306-(2n–1), and 306-2n are provided to one side surface of each of odd-numbered light guide plates 302-1, 302-3, through to, 302-(2n–3), and 302-(2n–1) and even-numbered light sources 302-2, 302-4, through to, 302-(2n–2), and 302-2n of the light sources 306-1, 306-2, through to, 306-(2n–1), and 306-2n are provided to the other side surface of each of even-numbered light guide plates 302-2, 302-4, through to, 302-(2n–2), and 302-2n, as illustrated in FIG. 4A. In addition, all of the light sources 306-1', 306-2', through to, 306-(2n–1)', and 306-2n' may be disposed in one direction of the light guide plates 302-1, 302-2, through to, 302-(2n–1), and 302-2n, as illustrated in FIG. 4B. The intensity and uniformity of brightness of the light guide plates may be determined according to the positions of the light sources. In general, when the light guide plates are positioned as illustrated in FIG. 4A, the uniformity of brightness of the light guide plates may be improved.

Figure 5:
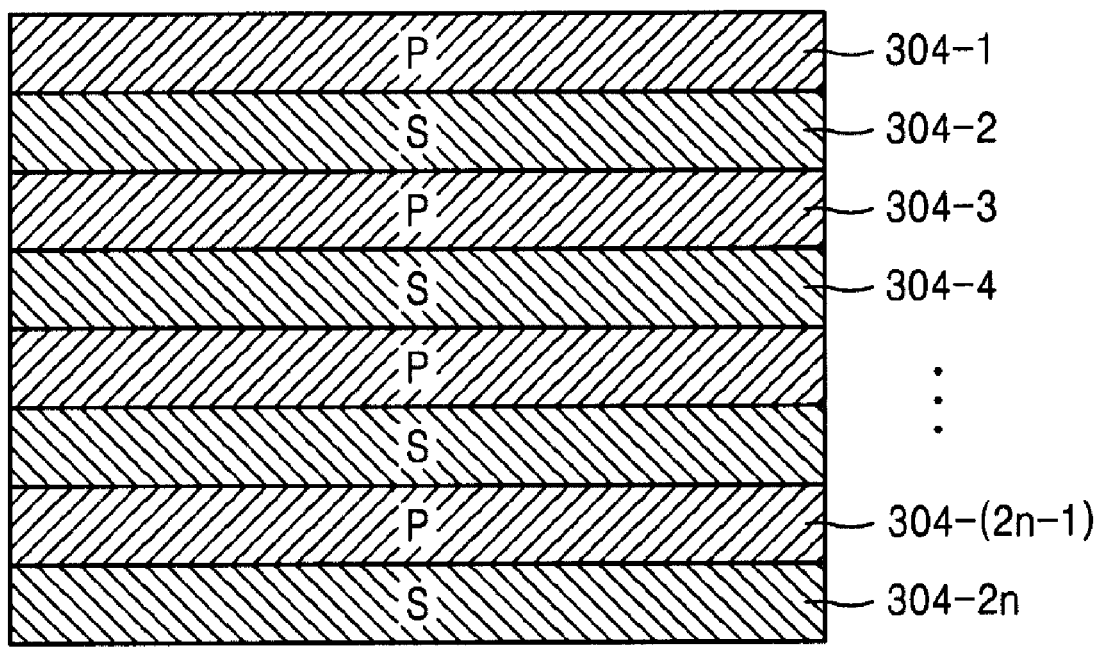
FIG. 5 is a front view of a polarization filter disposed at a light guide plate of a backlight according to an exemplary embodiment of the present invention.

FIG. 5 is a front view of a polarization filter disposed at a light guide plate of a backlight according to an exemplary embodiment of the present invention Polarization filters 304-1, 304-2, through to, 304-(2n–1), and 304-2n may be provided in the front of each light guide plate which constitutes one segment.

A polarization filter must provide different polarization directions according to properties of inputted images. According to the present invention, since a left image and a right image which are inputted images, are alternately inputted to an odd-numbered frame and an even-numbered frame, a polarization direction in which light is emitted to the left image and a polarization direction in which light is emitted to the right image must be different. Thus, since two shapes are needed, a polarization filter having a polarization direction of 0° and 90° and a polarization filter having a polarization direction of 45° and 135° (or –45°) are used.

According to an exemplary embodiment of the present invention, an odd-numbered segment of a backlight illuminates an odd-numbered frame and the odd-numbered segment must have the same polarization direction. Similarly, an even-numbered segment of the backlight illuminates an even-numbered frame and the even-numbered segment must have the same polarization direction. Thus, odd-numbered light guide plates 302-1, 302-3, through to, 302-(2n–3), and 302-(2n–1) of the backlight comprise polarization filters 304-1, 304-3, through to, 304-(2n–3), and 304-(2n–1) having the same polarization direction. Similarly, even-numbered light guide plates 302-2, 302-4, through to, 302-(2n–1), and 302-2n must comprise polarization filters 304-2, 304-4, through to, 304-(2n–2), and 304-2n having a polarization direction of 90° with respect to polarization filters 304-1, 304-3, through to, 304-(2n–3), and 304-(2n–1) of the odd-numbered light guide plates 302-1, 302-3, through to, 302-(2n–3), and 302-(2n–1).

As a result, the polarization directions of the polarization filters disposed on the light guide plates are alternately changed by 90° according to upper and lower sequences of segments of the backlight, as illustrated in FIG. 5. As such, the backlight emits light having a polarization direction of 90° according to frequencies of odd-numbered and even-numbered frames.

Figure 6:
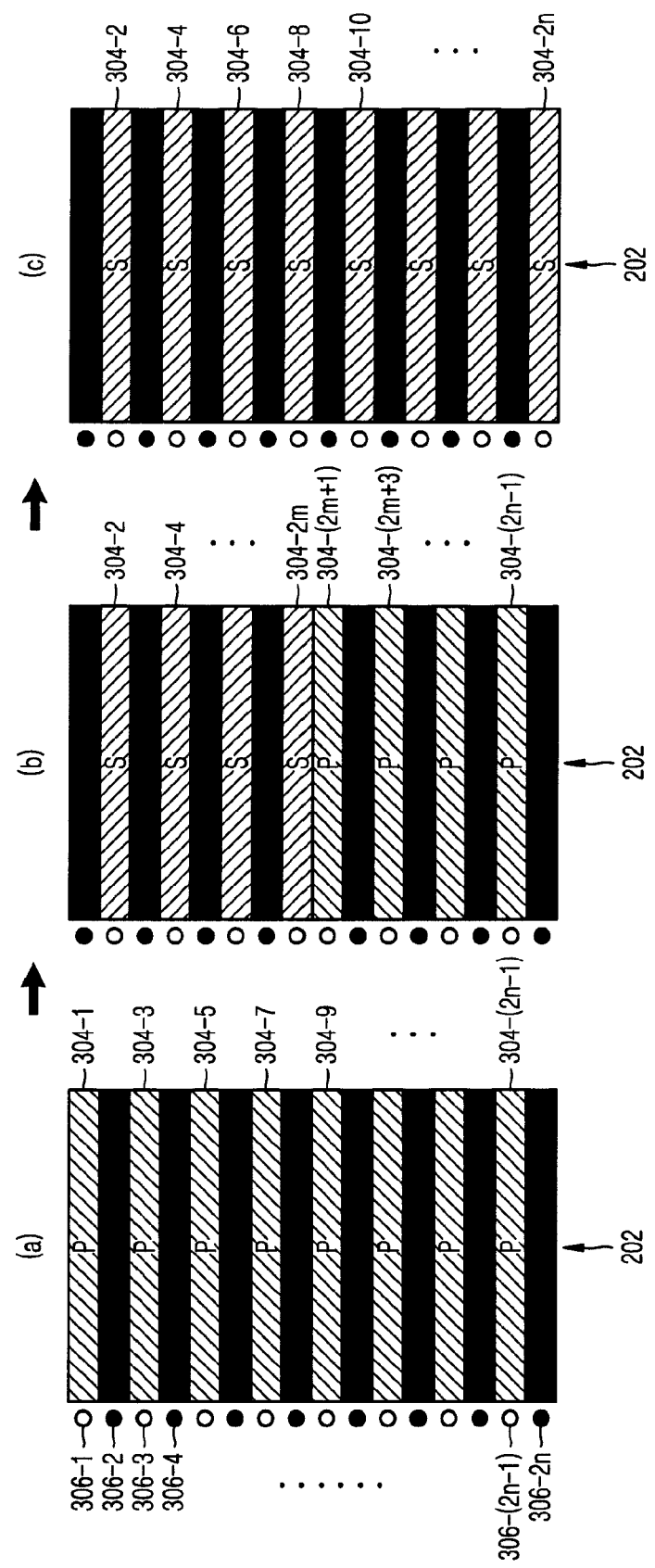
FIG. 6 illustrates an example of a scanning method of a backlight according to an exemplary embodiment of the present invention.
Figure 7:
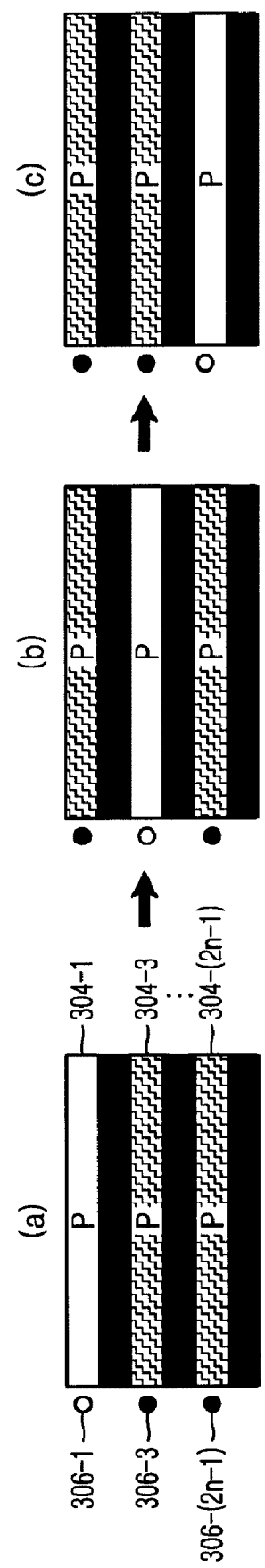
FIG. 7 illustrates another example of a scanning method of a backlight according to an exemplary embodiment of the present invention.

FIGS. 6 and 7 illustrate scanning methods of a backlight according to exemplary embodiments of the present invention.

Frames inputted to a display panel are scanned from high to low in the display panel. The frames are consecutively inputted to the display panel while a lower end of the next frame is in contact with an upper end of the previous image, and the next frame is also scanned from high to low in the display panel, and this procedure is repeatedly performed. Since in a 3D image, left and right images constitute one image, the left and right images are consecutively and alternately inputted to an odd-numbered frame and an even-numbered frame.

Since the backlight 202 must illuminate an image inputted to the display panel, turn-on and turn-off frequencies of the backlight sources 306-1, 306-2, through to, 306-(2n–1), and 306-2n must be synchronized with input frequencies of images. In an exemplary embodiment of the present invention, when odd-numbered frames are inputted to the display panel, the odd-numbered light sources 306-1, 306-3, through to, 306-(2n–3), and 306-(2n–1) of the backlight operate, and similarly, at an input frequency of even-numbered frames, even-numbered light sources 306-2, 306-4, through to, 306-(2n–2), and 306-2n of the backlight operate.

There are two backlight scanning methods which can be implemented according to exemplary embodiments of the present invention. FIG. 6 illustrates a scanning method by which a plurality of light sources of the backlight are simultaneously turned on, and FIG. 7 illustrates a scanning method by which only one light source of the backlight is turned on.

Hatched portions of FIG. 6. denote a state where the light sources are turned on and emit light, and dark portions of FIG. 6 denote a state where the light sources are turned off.

(a) of FIG. 6 illustrates the state where all odd-numbered light sources 306-1, 306-3, through to, 306-(2n−3), and 306-(2n−1) of the backlight are turned on when only odd-numbered frames are displayed on a display panel.

(b) of FIG. 6 illustrates the state where even-numbered frames subsequent to odd-numbered frames are consecutively displayed so that odd-numbered light sources 306-(2m+1), 306-(2m+3), through to, 306-(2n−3), and 306-(2n−1) and even-numbered light sources 306-2, 306-4, through to, 306-(2m−2), and 306-2m of the backlight are turned on. Here, m denotes a positive integer that is smaller than n.

(c) of FIG. 6 illustrates the state where all of even-numbered light sources 306-2, 306-4, through to, 306-(2n−2), and 306-2n of the backlight are turned on when display of odd-numbered frames on the display panel is completed and only even-numbered frames are displayed on the display panel.

When the odd-numbered frames are inputted to the display panel as illustrated in (a) of FIG. 6, the odd-numbered light sources 306-1, 306-3, through to, 306-(2n−3), and 306-(2n−1) which correspond to p-polarization of the backlight 202 are turned on. According to a frequency in which an inputted image is scanned from high to low in the display panel, the odd-numbered light sources 306-1, 306-3, through to, 306-(2n−3), and 306-(2n−1) of the backlight 202 are also turned on in the lower direction from the upper direction of the display panel. Thus, the light sources which are disposed in a position of the display panel in which corresponding images are displayed, are kept in a turned on state. In this case, when the odd-numbered light sources 306-1, 306-3, through to, 306-(2n−3), and 306-(2n−1) are scanned, the even-numbered light sources 306-2, 306-4, through to, 306-(2n−2), and 306-2n operate in a mode in which light is not transmitted, from a viewer's point of view.

In addition, when a lower end of a current inputted image contacts a lower end of the display panel as illustrated in (b) of FIG. 6, the current image is not displayed on the upper portion of the upper end of the current inputted image of the display panel any longer. Thus, the odd-numbered light sources 306-1, 306-3, through to, 306-(2n−3), and 306-(2n−1) of the backlight which correspond to a portion in which the movement of the inputted image is completed are changed from a turned on state to a turned off state.

Since odd-numbered frames and even-numbered frames of the inputted image are consecutively inputted to the display panel, even-numbered frames are displayed in a portion in which the movement of the odd-numbered frames is completed. Thus, the even-numbered light sources 306-2, 306-4, through to, 306-(2n−2), and 306-2n of the backlight are sequentially turned on from high to low in the display panel, and the even-numbered light sources 306-2, 306-4, through to, 306-(2m−2), and 306-2m of the backlight which correspond to a portion in which the even-numbered frames are displayed, are kept in a turned on state.

As a result, since a lower portion of the backlight 202 illuminates odd-numbered frames as illustrated in (b) of FIG. 6, only the odd-numbered light sources 306-(2m+1), 306-(2m+3), through to, 306-(2n−3), and 306-(2n−1) of the backlight 202 having a p-polarization direction are turned on and the even-numbered light sources 306-(2m+2), 306-(2m+4), through to, 306-(2n−2), and 306-2n are turned off. On the other hand, an upper portion of the backlight 202 illuminates even-numbered frames, the even-numbered light sources 306-2, 306-4, through to, 306-(2m−2), and 306-2m of the backlight 202 having a p-polarization direction are turned on, and the odd-numbered light sources 306-1, 306-3, through to, 306-(2m−3), and 306-(2m−1) of the backlight 202 are turned off. Thus, the lower portion of the backlight 202 operates in a mode in which the even-numbered light sources 306-(2m+2), (2m+4), through to, 306-(2n−2), and 306-2n do not emit light and the upper portion of the backlight 202 operates in a mode in which the odd-numbered light sources 306-1, 306-3, through to, 306-(2m−3), and 306-(2m−1) do not emit light.

As illustrated in (c) of FIG. 6, when the movement of the odd-numbered frames to the lower portion of the backlight 202 is completed and only the even-numbered frames are displayed on the display panel, only the even-numbered light sources 306-2, 306-4, through to, 306-(2n−2), and 306-2n of the backlight 202 are turned on. All of the odd-numbered light sources 306-1, 306-3, through to, 306-(2n−3), and 306-(2n−1) of the backlight 202 are turned off, and only the even-numbered light sources 306-2, 306-4, through to, 306-(2n−2), and 306-2n which are disposed on the light guide panels 302-2, 302-4, through to, 302-(2n−2), and 302-2n in which the polarization filters 304-2, 304-4, through to, 304-(2n−2), and 304-2n having a polarization direction are provided, are turned on. Thus, light in an s-polarization direction is transmitted at a frequency of even-numbered frames. At this time, the even-numbered light sources 306-1, 306-3, through to, 306-(2n−3), and 306-(2n−1) operates in an non-irradiating mode.

Referring to FIG. 7, basically, at the odd-numbered frames, the odd-numbered frames 306-1, 306-3, through to, 306-(2n−3), and 306-(2n−1) of the backlight 202 are turned on, and at the even-numbered frames, the even-numbered frames 306-2, 306-4, through to, 306-(2n−2), and 306-2n are turned on. A concept in which this procedure is repeatedly performed is the same as in FIG. 6. For convenience of explanation, FIG. 7 illustrates the operating procedure of only the odd-numbered light sources 306-1, 306-3, through to, 306-(2n−3), and 306-(2n−1) having a p-polarization direction. Bright portions of the odd-numbered light sources 306-1, 306-3, through to, 306-(2n−3), and 306-(2n−1) denote the state where corresponding light sources are turned on, and hatched portions thereof denote the state where corresponding light sources are turned off.

In FIG. 7, light sources of the backlight 202 are repeatedly turned on and turned off one by one instead of simultaneously keeping the light sources, which are to be turned on at a frequency in which an inputted image is displayed, in a turned on state, as illustrated in FIG. 6. In detail, the currently-turned-on light source 306-1 is turned off and the next light source 306-3 is turned on simultaneously, and the turned-on light source 306-3 is turned off and the light source 306-5 is turned on simultaneously. In detail, the turned-on light source 306-(2m−1) is turned off before a procedure of turning on the light source 306-(2m+1) is repeatedly performed. In the present invention, since a light source of the backlight operates from high to low, the light source is turned on and then is turned off and the next light source, disposed below that light source, is turned on simultaneously.

According to the method, vision fields are sufficiently separated from one another so that the possibility of causing crosstalk in which an image that must be shown only for an instant is also shown at the next instant when another image is displayed, is reduced. However, since light is provided to the display panel by one light source of the backlight, brightness is relatively low. Thus, the intensity of the light source of the backlight must be increased.

In order to implement the backlight scanning methods that have been described with reference to FIGS. 6 and 7 as above, in an exemplary embodiment of the present invention, the turn-on and turn-off frequencies of the light sources 306-1, 306-2, through to, 306-(2n−1), and 306-2n which are respectively disposed on the light guide plates 302-1, 302-2, through to, 302-(2n−1), and 302-2n of the backlight, are synchronized with the procedure in which the odd-numbered frames and the even-numbered frames are consecutively and alternately inputted to the display panel.

In an exemplary embodiment of the present invention, since an image is inputted to the display panel at a frequency of 60 Hz, the odd-numbered and even-numbered light sources of the backlight are also synchronized with the frequency of 60 Hz according to a frequency in which a left image and a right image are respectively inputted at a frequency of 60 Hz, and are turned on and turned off at a predetermined speed.

Figure 8:
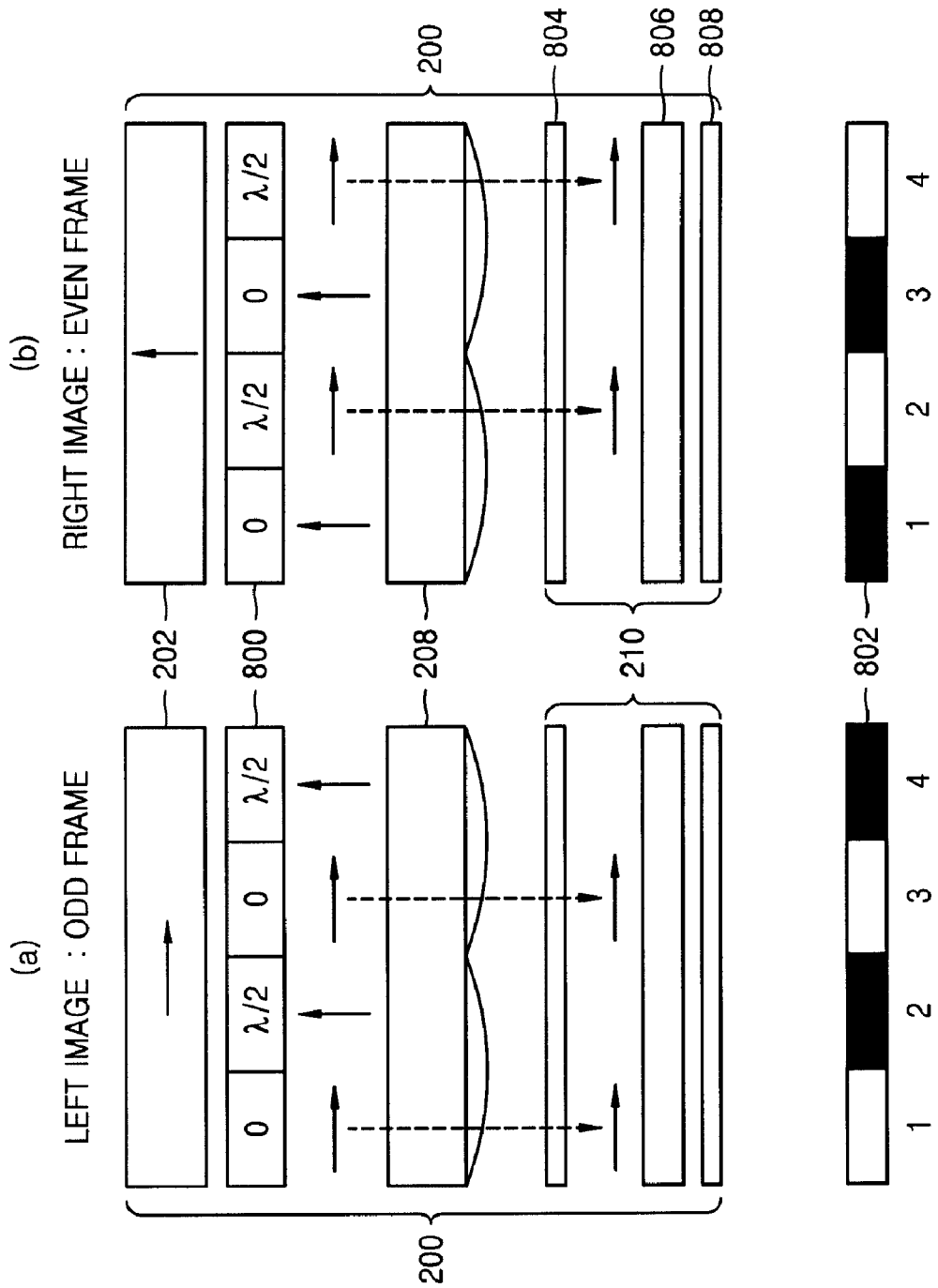
FIG. 8 illustrates vision fields to be switched when delay frequencies of a retarder is 0 and ½ of a phase frequency, respectively, according to an exemplary embodiment of the present invention.
Figure 9:
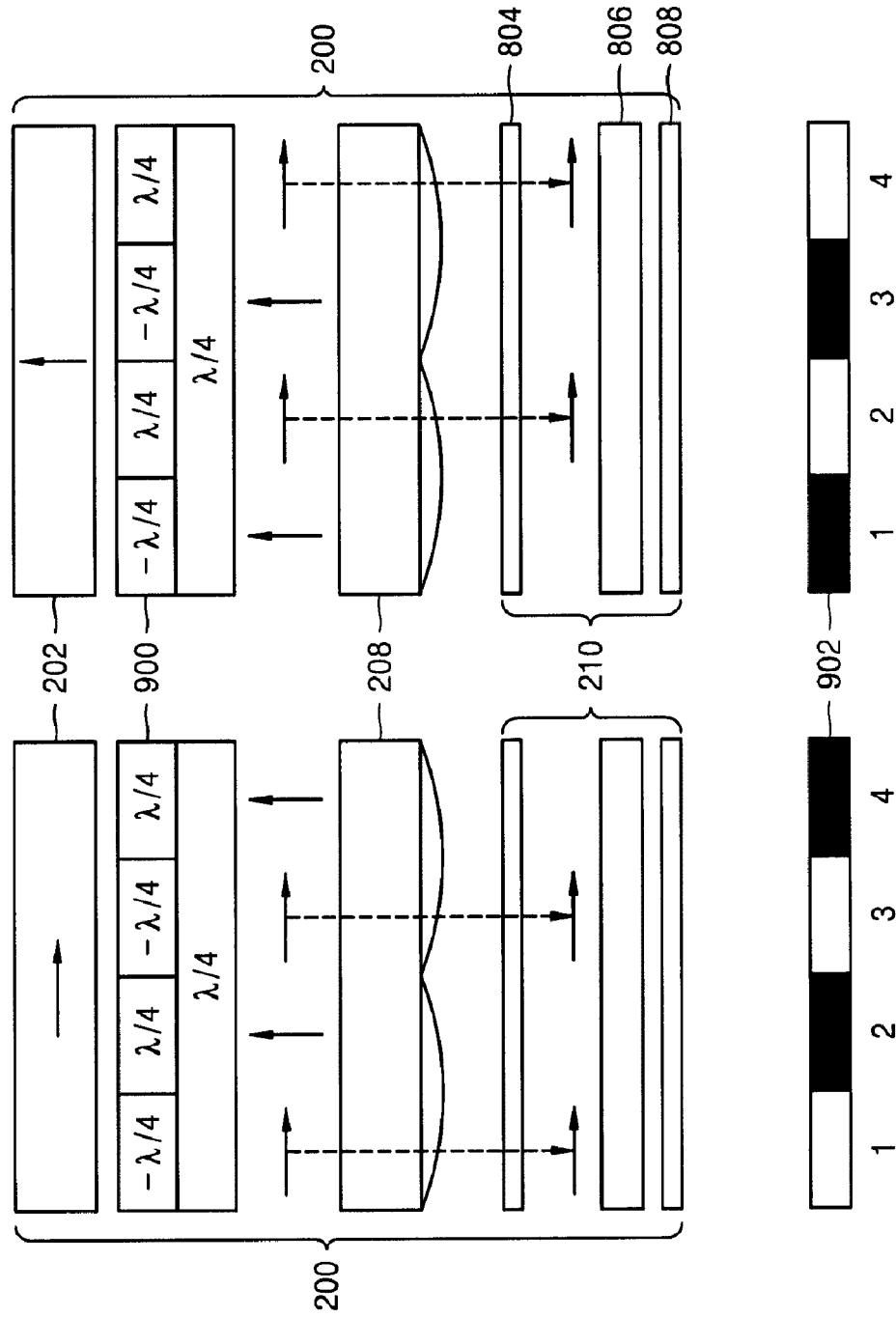
FIG. 9 illustrates vision fields to be switched when delay frequencies of a retarder is ¼ and ¾ of a phase frequency, respectively, according to another exemplary embodiment of the present invention.

FIGS. 8 and 9 illustrate the display operation of a 3D image at delay frequencies of a retarder, according to exemplary embodiments of the present invention.

FIG. 8 is a plan view of a display apparatus 200 illustrated in FIG. 2. In particular, FIG. 8 illustrates vision fields 802 to be switched when a delay frequency of the retarder 800 of the display apparatus 200 is 0 or ½ of the frequency.

(a) and (b) of FIG. 8 illustrate the cases where odd-numbered frames and even-numbered frames are respectively inputted to the display panel so as to display a 3D image, and respective elements are the same. In detail, the display apparatus 200 comprises a backlight 202, a retarder 800, a lenticular array 208, and a display panel 210. For convenience of explanation, a p-polarization direction is marked by arrows in a widthwise direction and an s-polarization direction is marked by arrows in a lengthwise direction.

The vision fields 802 denote vision regions in which a viewer views an image due to light transmitted through an LCD.

The display panel 210 comprises a liquid crystal layer 806 and polarization filters 804 and 808. The polarization filters 804 and 808 transmit only light that reaches the display panel 210 and has a predetermined polarization direction and allow the vision fields of the image viewed by the viewer to be separated from one another.

In an exemplary embodiment of the present invention, a left image of the 3D image is inputted to an odd-numbered frame, as illustrated in (a) of FIG. 8, and a right image of the 3D image is inputted to an even-numbered frame, as illustrated in (b) of FIG. 8.

Referring to (a) of FIG. 8, when the odd-numbered frame is inputted to the display panel 210, the turn-on and turn-off frequencies of the backlight 202 are synchronized using a method of controlling the display apparatus 200 so that only odd-numbered light sources of the backlight 202 operate so as to transmit only light having a p-polarization direction. Thus, the phase of light of a p-polarization component that transmits the backlight 202 is changed by the retarder 800. Here, λ denotes a frequency of the retarder 800. The phase of light is not changed in odd-numbered columns of the retarder 800 and is delayed by λ/2 in even-numbered columns of the retarder 800. Light in the p-polarization direction that travels in the backlight 202 is transmitted through the retarder 800, is kept at a phase in a p-polarization direction in odd-numbered columns of the retarder 800, and has a phase in an s-polarization direction in even-numbered columns of the retarder 800.

When the polarization filters 804 and 808 of the display panel 210 have a p-polarization direction so as to transmit light in only a p-polarization direction, light being transmitted to the display panel 210 is light in the p-polarization direction and light in even-numbered columns is not transmitted to the display panel 208 and only odd-numbered columns of an image are displayed to the viewer in the vision fields 802.

Similarly, referring to (b) of FIG. 8, when even-numbered frames are inputted to the display panel 210, turn-on and turn-off frequencies of the light sources are synchronized so that only the even-numbered light sources of the backlight 202 operate. Thus, light emitted from the backlight 202 is light in the s-polarization direction, light in the s-polarization direction is transmitted through the retarder 800 in odd-numbered columns of the vision fields 802 and light in the p-polarization direction is transmitted through the retarder 800 in even-numbered columns of the vision fields 802. Since the display panel 210 according to an exemplary embodiment of the present invention transmits only light in the p-polarization direction by using the polarization filters 804 and 808, light in the odd-numbered columns of the vision fields 802 is not transmitted and only light in the even-numbered columns of the vision fields 802 is transmitted. Thus, a signal that reaches the viewer in the vision fields 802 is generated in the even-numbered columns of the vision fields 802.

As illustrated in (a) and (b) of FIG. 8, when the odd-numbered frames and the even-numbered frames are alternately and repeatedly inputted to the display panel 210, the left image and the right image of the 3D image are alternately inputted to the display panel 210. Since the left image is formed in the odd-numbered columns of the vision fields 802 and the right image is formed in the even-numbered columns of the vision fields 802, the vision fields 802 are switched and the viewer views the left and right images alternately. However, due to limitations of human visual perception, even when two images are alternately displayed, a viewer perceives one image, and due to a binocular time difference of the left and right images, the viewer perceives a 3D image. Thus, the viewer can view the 3D image with full resolution according to an exemplary embodiment of the present invention. In addition, since the vision fields 802 are switched and separated from one another, crosstalk is reduced.

FIG. 9 is a plan view of the 3D display apparatus 200 according to the present invention. In particular, FIG. 9 illustrates vision fields 902 to be switched when delay frequencies λ of a phase of a retarder 900 are λ/4 and 3λ/4, respectively, when the display apparatus 200 is driven.

Elements of (a) and (b) of FIG. 9 are identical with those of (a) and (b) of FIG. 8 except for the retarder 900. Similarly, a left image is inputted to odd-numbered frames and a right image is inputted to even-numbered frames.

The retarder 900, of which delay frequencies are λ/4 and 3λ/4, respectively, transmits light having a phase in a one-polarization direction unlike the retarder 800 having a phase of a ½ of the frequency. Even when specific polarization directions are different, the retarder 900 transmits only light in a particular polarization direction in the display panel 210, like the retarder 800 having ½ frequency polarization. Thus, as illustrated in FIG. 8, the left image of (a) of FIG. 9 is formed only in odd-numbered columns of the vision fields 902 and the right image of (b) of FIG. 9 is formed only in even-numbered columns of the vision fields 902 so that the vision fields 902 are switched. Similarly, the left and right images are alternately switched in the odd-numbered and even-numbered columns of the vision fields 902 and are displayed to the viewer's eyes as one image, and a 3D image with full resolution is provided to the viewer. Similarly, a region to which an image is transmitted is separated from the vision fields 902 and is switched so that the adverse effects of crosstalk are reduced.

Figure 10:
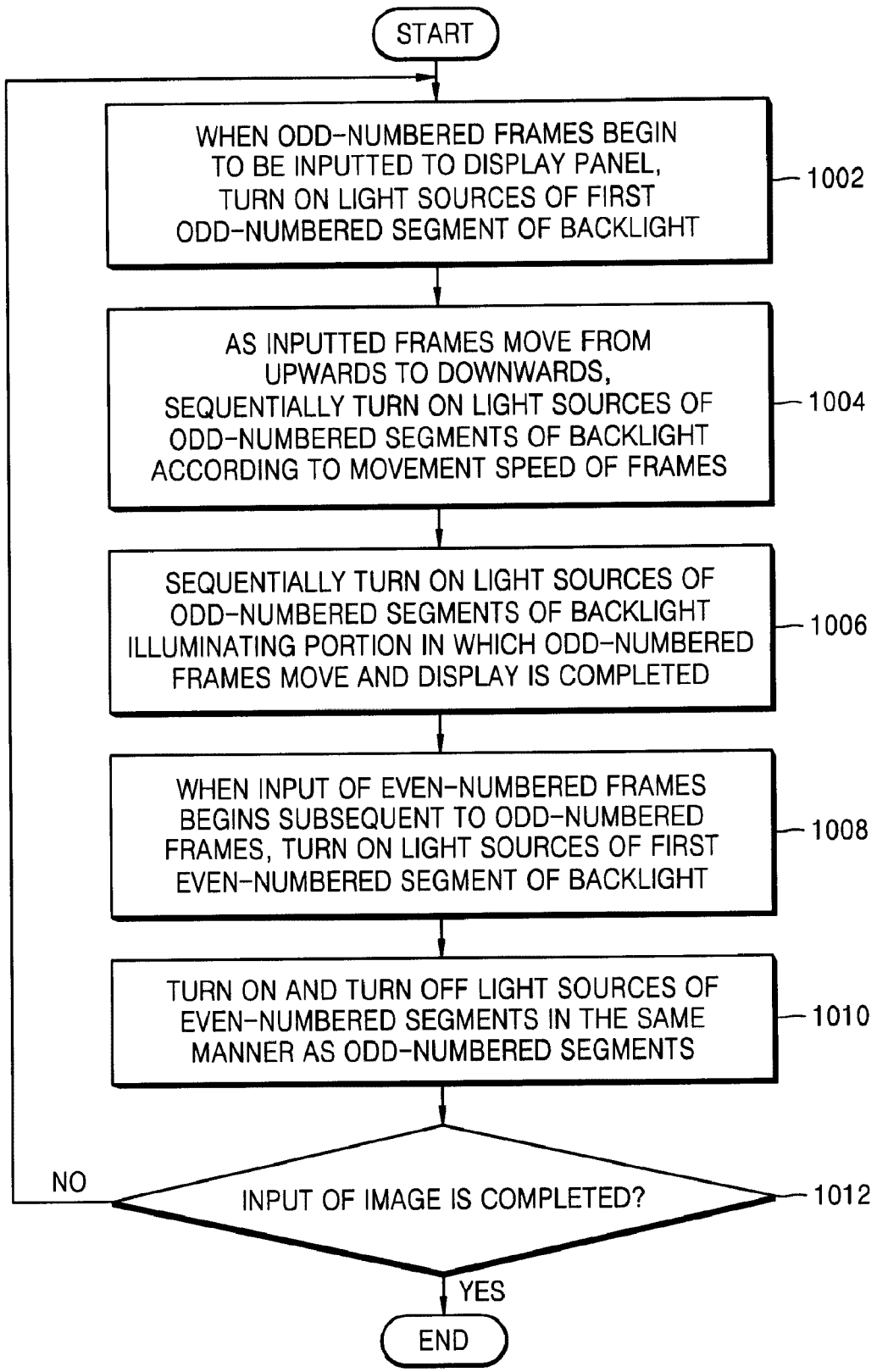
FIG. 10 is a flowchart illustrating a method of synchronizing backlight operation with an input frequency of an image according to an exemplary embodiment of the present invention.

FIG. 10 is a flowchart illustrating a method of synchronizing backlight operation with an input frequency of an image according to an exemplary embodiment of the present invention.

In operation 1002, when an image signal of odd-numbered frames begins to be inputted to a display panel, light sources of a first odd-numbered segment of the backlight are turned on.

In operation 1004, as the inputted frames move from top to bottom, light sources of odd-numbered segments of the backlight are sequentially turned on from top to bottom according to the movement speed of the frames.

In operation 1006, the light sources of the odd-numbered segments of the backlight, which correspond to a portion in which the odd-numbered frames move and display is completed, are sequentially turned off, like the case where the light sources of the odd-numbered segments of the backlight are turned on.

In operation 1008, when input of even-numbered frames begins subsequent to the odd-numbered frames, light sources of a first even-numbered segment of the backlight are turned on.

In operation 1010, the light sources of the even-numbered segments are sequentially turned on in the same manner as the light sources of the odd-numbered segments, and the light sources which correspond to a portion in which movement of the even-numbed frames is completed, are turned off.

In operation 1012, it is determined whether input of the next frame is consecutively performed, and when input of the next odd-numbered frames subsequent to the even-numbed frames of operation 1010 is consecutively performed, the method goes back to operation 1002 and operation 1002, through to, 1010 are performed again. If there is no further input of the next frames, turn-on and turn-off of the backlight is completed.

According to an exemplary embodiment of the present invention, a 2D image can be displayed according to inputted frames. In detail, the 2D image can be displayed with full resolution by inputting the same image instead of displaying a 3D image by inputting left and right images to odd-numbered frames and even-numbered frames.

In addition, in another exemplary embodiment of the present invention, all light sources are kept in a turned on or turned off state instead of scanning with the backlight so that the 2D image can be displayed.

In the 2D/3D display apparatus using a scanning backlight and the method of controlling the same according to the present invention, the number of components can be reduced so as to reduce costs and the adverse effects of crosstalk, and an image with full resolution can be displayed.

In order to implement a scanning backlight, the backlight comprises a plurality of light guide plates and a plurality of light sources. The plurality of light guide plates which are independently provided, are arranged in parallel with one another so that the light sources disposed on the light guide plates can be turned on or turned off independent of other light guide plates and light sources. Thus, an illumination function and a scanning function are simultaneously performed using one backlight such that the number of components is reduced, thereby reducing costs and the adverse effects of lowering of brightness and inducing efficient and economical effects.

In addition, the backlight performs a scanning operation according to an input frequency of an image inputted to the display panel and is controlled to be synchronized with the input frequency so as to illuminate the display such that a 3D image is displayed and crosstalk is reduced.

Furthermore, the 2D image can be displayed without any structural change in a display apparatus.

Accordingly, the present invention can be applied in various formats to industrial fields, such as a 2D LCD display apparatus, a 2D plasma display panel (PDP) display apparatus, a flat display apparatus, a 3D stereoscopic game image apparatus, a broadcasting 3D TV, a stereoscopic advertisement display, a military apparatus, a simulation training display, a medical apparatus 3D display, etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a 2-dimensional/3-dimensional (2D/3D) switchable display apparatus including a scanning backlight and a lenticular array, the backlight illuminating a display panel and including a plurality of light guide plates, a plurality of light sources disposed on the respective light guide plates, and a plurality of first polarization filters and a plurality of second polarization filters, and wherein a second polarization direction of the second polarization filters differs by 90° from a first polarization direction of the first polarization filters, the method comprising:

turning on odd-numbered light sources of the backlight only at a frequency at which odd-numbered frames are inputted to the display panel, such that light having the first polarization direction is output from the backlight and transmitted to the lenticular array;

turning on even-numbered light sources of the backlight only at a frequency at which even-numbered frames are inputted to the display panel, such that light having the second polarization direction is output from the backlight and transmitted to the lenticular array; and while input of the odd-numbered or even-numbered frames is repeatedly performed, repeatedly and alternately turning on the odd-numbered or even-numbered light sources;

wherein each of the plurality of first polarization filters is merged with one of the odd-numbered light guide plates as one unit, combined on light emitting surfaces of the odd-numbered light guide plates and each of the plurality of second polarization filters is merged with one of the even-numbered light guide plates as one unit, combined on light emitting surfaces of the even-numbered light guide plates.

2. The method of claim 1, wherein the turning on of the odd-numbered or even-numbered light sources comprises:

for 3D display, as the frames are inputted to an upper end of the display panel and move to a lower end, sequentially turning on the light sources illuminating the frames from the upper end to the lower end;

as the frames move to the lower end of the display panel, and the display of the frames is completed, turning off the light sources that are turned on so as to illuminate the display panel; and as the frames are consecutively inputted to the display panel and move toward the lower end, repeatedly performing the turning on and the turning off.

3. The method of claim 1, wherein the turning on of the odd-numbered or even-numbered light sources comprises:

for 3D display, as the frames are inputted to an upper end of the display panel and move to a lower end, sequentially turning on the light sources illuminating the frames from the upper end to the lower end;

turning on the next light source and simultaneously turning off the currently-turned-on light sources; and repeatedly performing the turning on.

4. The method of claim 1, wherein, for 2D display, the odd-numbered frames and the even-numbered frames that are inputted immediately after the odd-numbered frames, respectively, are the same image.

* * * * *